(12) United States Patent
Ziskind et al.

(10) Patent No.: US 11,606,798 B2
(45) Date of Patent: Mar. 14, 2023

(54) SIGNAL COLLISION AVOIDANCE BETWEEN TERRESTRIAL RADIO TOWERS AND AIRBORNE PLATFORMS

(71) Applicant: ATC Technologies LLC, Reston, VA (US)

(72) Inventors: Ilya Ziskind, Sterling, VA (US); David Nance, Sterling, VA (US)

(73) Assignee: ATC Technologies, LLC, Reston, VA (US)

(*) Notice: Subject to any disclaimer, the term of this patent is extended or adjusted under 35 U.S.C. 154(b) by 66 days.

(21) Appl. No.: 17/190,847

(22) Filed: Mar. 3, 2021

(65) Prior Publication Data

US 2021/0282153 A1    Sep. 9, 2021

Related U.S. Application Data

(60) Provisional application No. 62/984,559, filed on Mar. 3, 2020.

(51) Int. Cl.
*H04W 52/10* (2009.01)
*H04W 72/08* (2009.01)
(Continued)

(52) U.S. Cl.
CPC ........ *H04W 72/082* (2013.01); *G08G 5/0013* (2013.01); *G08G 5/0082* (2013.01);
(Continued)

(58) Field of Classification Search
CPC ............. H04W 72/082; H04W 72/005; H04W 72/0453; H04W 72/048; G08G 5/0013; G08G 5/0082; G01V 1/001
(Continued)

(56) References Cited

U.S. PATENT DOCUMENTS 5,367,539 A * 11/1994 Copley ................ H04B 7/2621
455/454
5,886,666 A * 3/1999 Schellenberg ........ G01S 19/115
701/489
(Continued)

OTHER PUBLICATIONS

PCT/US2021/020639 International Search Report and Written Opinion dated Oct. 13, 2021.

*Primary Examiner* — Hai V Nguyen
(74) *Attorney, Agent, or Firm* — Michael Best & Friedrich LLP

(57) ABSTRACT

A terrestrial communication systems, specifically a signal collision avoidance system between a terrestrial transmitter and an airborne receiver, is disclosed. The terrestrial communication system includes an electronic processor configured to determine a receive frequency from a nearby airborne receiver, determine a transmit frequency from a communicatively coupled terrestrial transmitter, and modify the transmit frequency of the terrestrial transmitter based on the determined receive frequency and transmit frequency. To modify the transmit frequency, the electronic processor compares the receive frequency and the transmit frequency to determine a channel type. Based on the determined channel type, including co-channel and adjacent-channel, the electronic processor modifies a spectrum signature of the transmit frequency so that the transmit frequency does not interfere with the receive frequency of the airborne receiver.

20 Claims, 13 Drawing Sheets

(51) Int. Cl.
*G08G 5/00* (2006.01)
*H04W 72/00* (2023.01)
*H04W 72/0453* (2023.01)
*H04W 72/04* (2023.01)
*G01V 1/00* (2006.01)

(52) U.S. Cl.
CPC ....... *H04W 72/005* (2013.01); *H04W 72/048* (2013.01); *H04W 72/0453* (2013.01); *G01V 1/001* (2013.01)

(58) Field of Classification Search
USPC .................................................. 455/3.06
See application file for complete search history.

(56) References Cited

U.S. PATENT DOCUMENTS

| | | | |
|---|---|---|---|
| 8,391,334 B1* | 3/2013 | Mower | H04B 7/04 455/456.6 |
| 9,237,211 B2* | 1/2016 | Tabe | H04W 52/04 |
| 9,446,858 B2* | 9/2016 | Hess | G05D 1/0094 |
| 10,031,553 B2* | 7/2018 | Yang | G06F 3/041 |
| 10,142,143 B2* | 11/2018 | Sagisaka | H04L 27/14 |
| 10,547,373 B2* | 1/2020 | Axmon | H04B 7/18523 |
| 11,443,246 B2* | 9/2022 | Gueye | G06Q 50/01 |
| 2002/0067661 A1* | 6/2002 | Huntress | G01V 1/223 367/136 |
| 2010/0075704 A1* | 3/2010 | McHenry | H04W 16/14 455/67.11 |
| 2010/0173586 A1* | 7/2010 | McHenry | H04W 72/0406 455/62 |
| 2016/0083115 A1* | 3/2016 | Hess | B64C 39/022 701/3 |
| 2016/0087658 A1* | 3/2016 | Weissman | H04B 1/10 455/78 |
| 2017/0192089 A1* | 7/2017 | Parker | H04K 3/45 |
| 2019/0260462 A1* | 8/2019 | Axmon | H04B 7/18506 |
| 2019/0303807 A1* | 10/2019 | Gueye | G06Q 20/3224 |
| 2020/0187151 A1* | 6/2020 | Wang | H04W 36/0058 |
| 2020/0296644 A1* | 9/2020 | Logothetis | H04W 64/006 |
| 2020/0350073 A1* | 11/2020 | Goldsmith | A61B 5/024 |
| 2021/0282153 A1* | 9/2021 | Ziskind | G08G 5/0026 |
| 2022/0099699 A1* | 3/2022 | Waite | H04R 29/005 |

\* cited by examiner

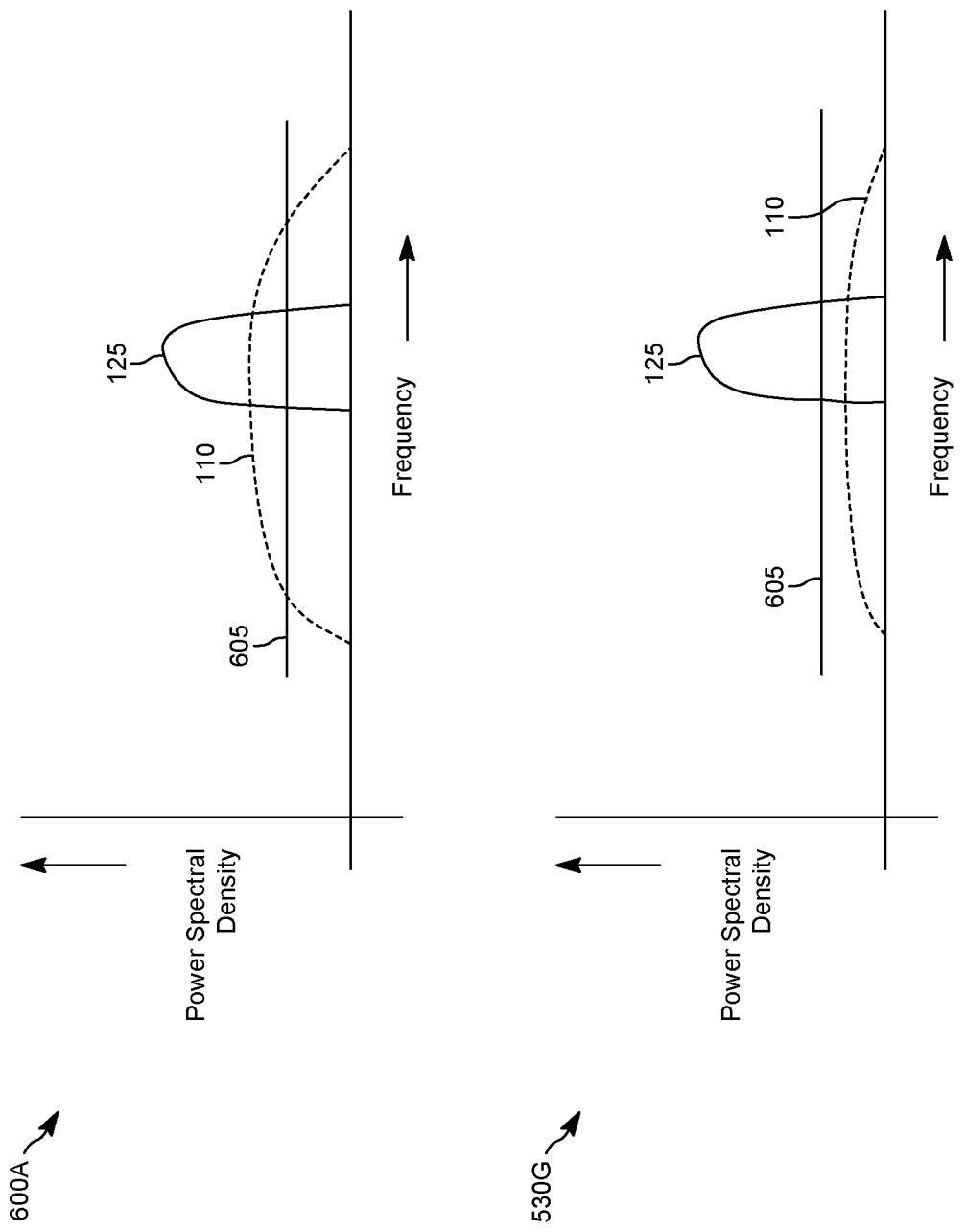

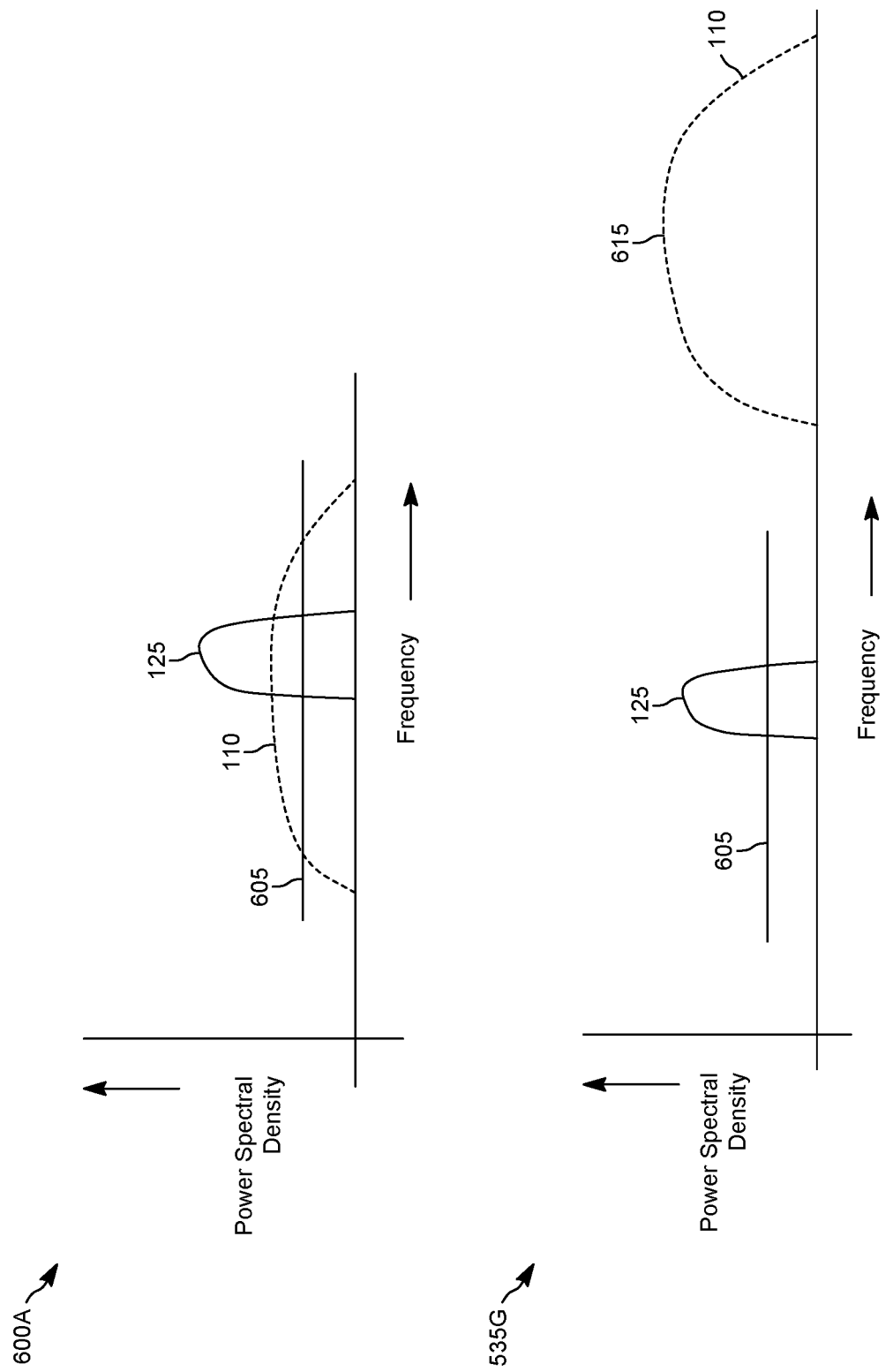

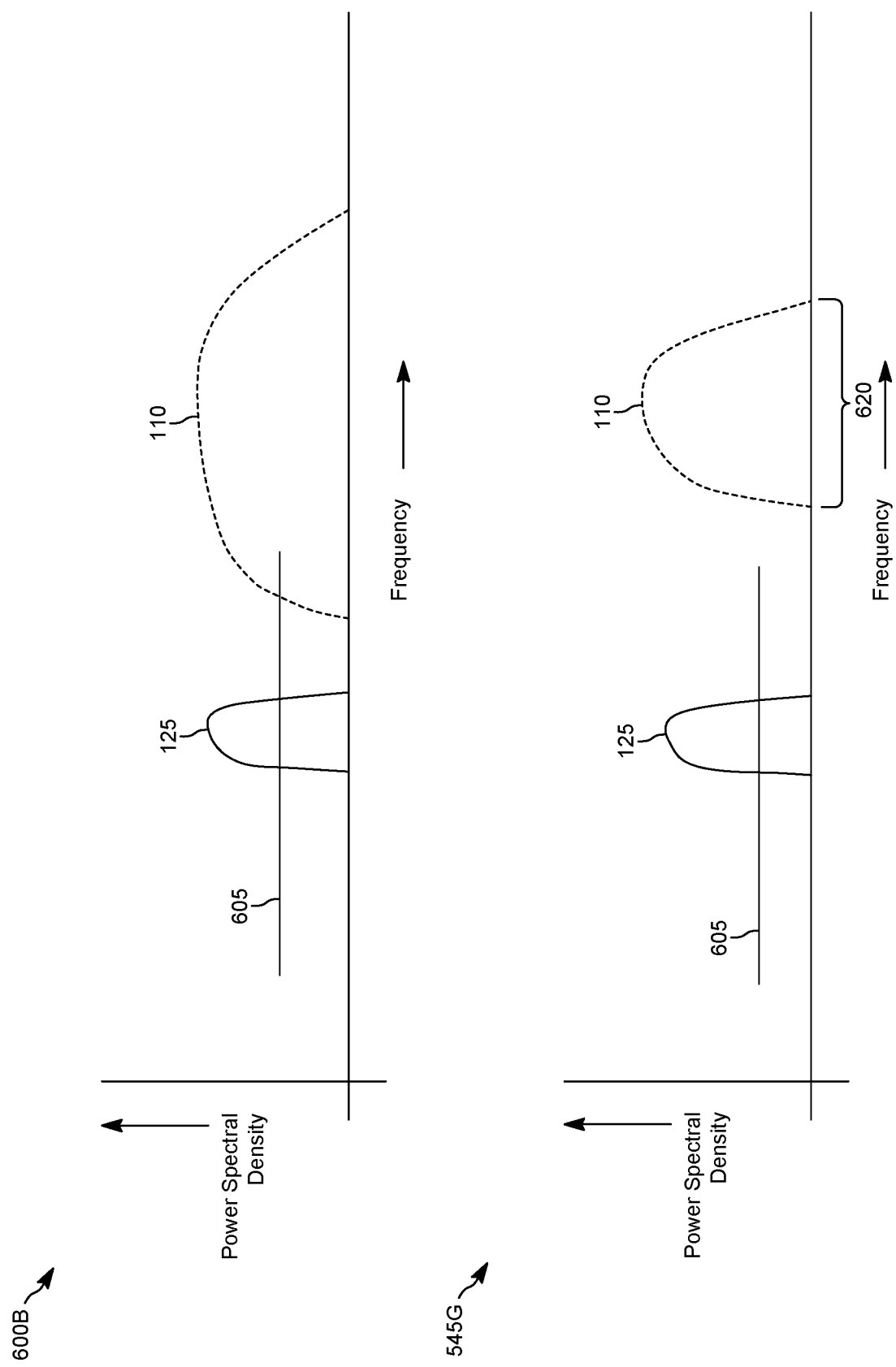

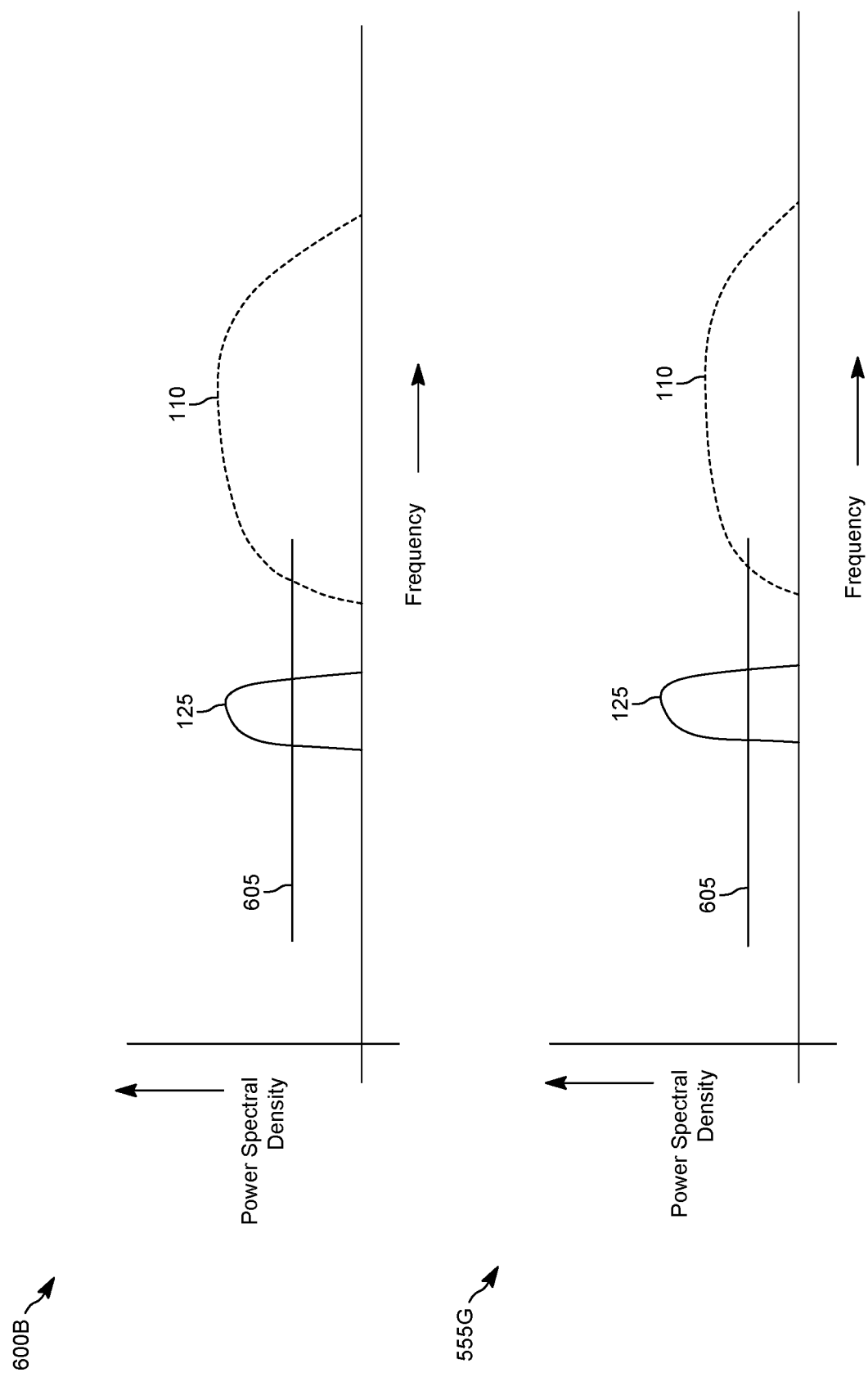

SIGNAL COLLISION AVOIDANCE BETWEEN TERRESTRIAL RADIO TOWERS AND AIRBORNE PLATFORMS

RELATED APPLICATION

The present application claims the benefit of U.S. Provisional Patent Application No. 62/984,559, filed Mar. 3, 2020, the entire contents of which is hereby incorporated by reference.

FIELD

Embodiments presented herein relate to a terrestrial communication system, more particularly to a signal collision avoidance system between a terrestrial transmitter and an airborne receiver.

SUMMARY

Aircraft use wireless radio signals transmitted at various frequencies to communicate with other aircraft and ground operations. Such aviation communication is a major source of information for the airborne aircraft and is used to relay traffic control information, aircraft location information, emergency support information, etc. to the aircraft from the ground and vice versa. Therefore, uninterrupted transmission and reception of uncorrupted radio signals is desirable.

Terrestrial transmitters, for example, radio towers supporting antennas used to transmit signals for telecommunications and broadcasting, may interfere with an aircraft's aviation communications. When an airborne aircraft approaches a terrestrial transmitter, the terrestrial transmitter's transmit frequency may be operating in a frequency band that is the same as or adjacent to the aircraft's receive frequency. In some instances, the signal power levels of the terrestrial transmitter may cause large parasitic demodulation of the transmit frequency to interfere with the airborne aircraft's receive frequency.

Therefore, embodiments disclosed in the present application address these problems by providing a terrestrial communication system, more particularly a signal collision avoidance system, between a terrestrial transmitter and a nearby airborne receiver to prevent the terrestrial transmitter's transmit frequency from interfering with the airborne aircraft's receive frequency.

One embodiment discloses a terrestrial communication system including a terrestrial transmitter and an electronic processor communicatively coupled to the terrestrial transmitter. The electronic processor is configured to determine a receive frequency of an airborne receiver, determine a transmit frequency of the terrestrial transmitter, and modify a spectrum signature of the terrestrial transmitter based on the receive frequency and the transmit frequency.

Another embodiment discloses a method of operating a terrestrial communication system. The method includes determining a receive frequency of an airborne receiver, determining a transmit frequency of a terrestrial transmitter, and modifying a spectrum signature of the terrestrial transmitter based on the receive frequency and the transmit frequency.

Other aspects of the application will become apparent by consideration of the detailed description and accompanying drawings.

BRIEF DESCRIPTION OF THE DRAWINGS

The aspects and features of various exemplary embodiments will be more apparent from the description of those exemplary embodiments taken with reference to the accompanying drawing, in which:

FIG. 7 is a graph illustrating reducing the transmit frequency to below a noise threshold of the airborne receiver in the co-channel channel type, according to some embodiments.

FIG. 8 is a graph illustrating translating a center frequency of the transmit frequency in the co-channel channel type, according to some embodiments.

FIG. 9 is a graph illustrating reducing a bandwidth of the transmit frequency in the adjacent-channel channel type, according to some embodiments.

FIG. 10 is a graph illustrating reducing the transmit frequency to below a mask threshold of the airborne receiver in the adjacent-channel channel type.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass terms listed thereafter and equivalents thereof as well as additional items. Use of "consisting of" and variations thereof as used herein is meant to encompass only the items listed thereafter and equivalents thereof.

The functionality described herein as being performed by one component may be performed by multiple components in a distributed manner. Likewise, functionality performed by multiple components may be consolidated and performed by a single component. Similarly, a component described as performing a particular functionality may also perform additional functionality not described herein. For example, a device or structure that is "configured" in a certain way is configured in at least that way but may also be configured in ways that are not listed.

As described herein, terms such as "front," "rear," "side," "top," "bottom," "above," "below," "upwardly," "downwardly," "right," and "left" are intended to facilitate the description of the terrestrial communication system of the present application, and are not intended to limit the application to any particular position or orientation.

Exemplary embodiments of terrestrial communication systems consistent with the present application include one or more of the novel features described in detail below. Such features may include an electronic processor configured to determine a receive frequency from a nearby airborne receiver, determine a transmit frequency from a communicatively coupled terrestrial transmitter, and modify the transmit frequency of the terrestrial transmitter based on the determined receive frequency and transmit frequency. The novel features detailed herein effectively prevent the terrestrial transmitter's transmit frequency from interfering with the nearby airborne receiver's receive frequency, ensuring that the airborne receiver maintains uninterrupted transmission and reception of uncorrupted communication signals. Although the application will be described with reference to the exemplary embodiments shown in the figures, it should be understood that the application can be embodied in many alternative forms of embodiments. In addition, various different types of electronic processors, terrestrial transmitters, and airborne receivers may comprise the described terrestrial communication system.

Figure 1:
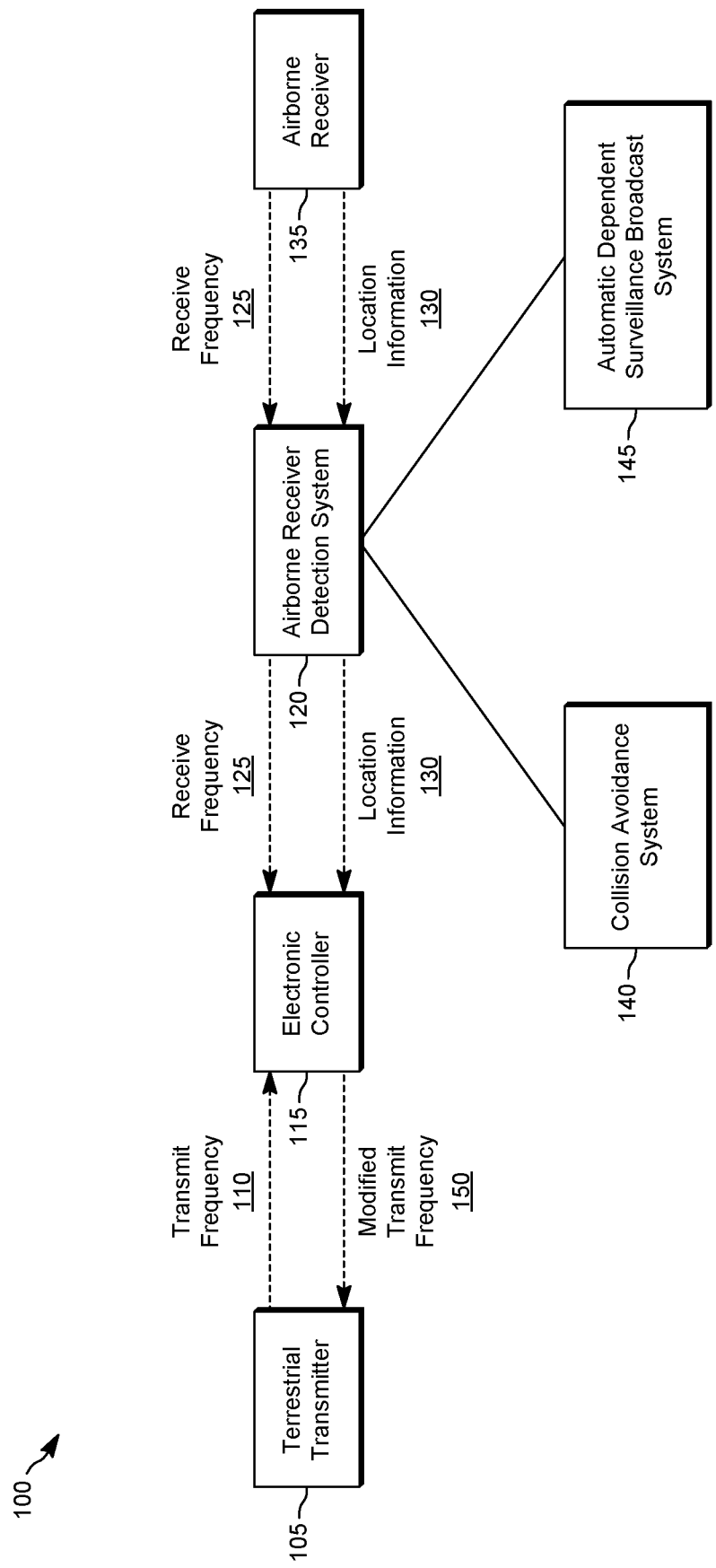
FIG. 1 is a component diagram of a terrestrial communication system, according to some embodiments.

FIG. 1 is a component diagram of a terrestrial communication system 100 according to one embodiment. In the present embodiment, the terrestrial communication system 100 includes a terrestrial transmitter 105, such as a radio tower supporting antennas used to continuously transmit telecommunications signals (for example, for two-way radio or cellular communications), and an electronic controller 115 communicatively coupled to the terrestrial transmitter 105. The electronic controller 115 receives a transmit frequency 110 from the terrestrial transmitter 105 and selectively transmits a modified transmit frequency 150 back to the terrestrial transmitter 105 based on a method of modifying the transmit frequency 110 described in detail below. In some embodiments, the electronic controller 115 is communicatively coupled to the terrestrial transmitter 105 via a wireless connection. In other embodiments, the electronic controller 115 is or is included in a cell site router that is physically coupled to the terrestrial transmitter 105 via a wired connection.

The terrestrial communication system 100 further includes an airborne receiver detection system 120 that detects when an airborne receiver 135 is within a threshold distance of the terrestrial transmitter 105. The threshold distance is set based on the frequencies power levels in use by the terrestrial transmitter 105. Upon detecting a nearby airborne receiver 135, the airborne receiver detection system 120 obtains a receive frequency 125 and location information 130 of the nearby airborne receiver 135 and relays the obtained receive frequency 125 and location information 130 to the electronic controller 115. In some embodiments, the airborne receiver detection system 120 is a proximity sensor communicatively coupled to the electronic controller 115 and configured to detect the airborne receiver 135 within a threshold distance of the terrestrial transmitter 105. For example, the airborne receiver detection system 120 may be a collision avoidance system 140 that detects the nearby airborne receiver 135 using acoustics-based aircraft detection. It should be understood by those skilled in the art that various embodiments of the airborne receiver detection system 120 may use different types of proximity sensors that detect various characteristics, such as ultrasonic, capacitive, photoelectric, inductive, magnetic, etc., to detect the nearby airborne receiver 135. In other embodiments, the airborne receiver detection system 120 is a receiver configured to receive broadcast signals emitted by the airborne receiver 135. In this example embodiment, the airborne receiver detection system 120 may be an automatic dependent surveillance broadcast (ADSB) system 145 that receives broadcast signals from the airborne receiver 135.

Figure 2:
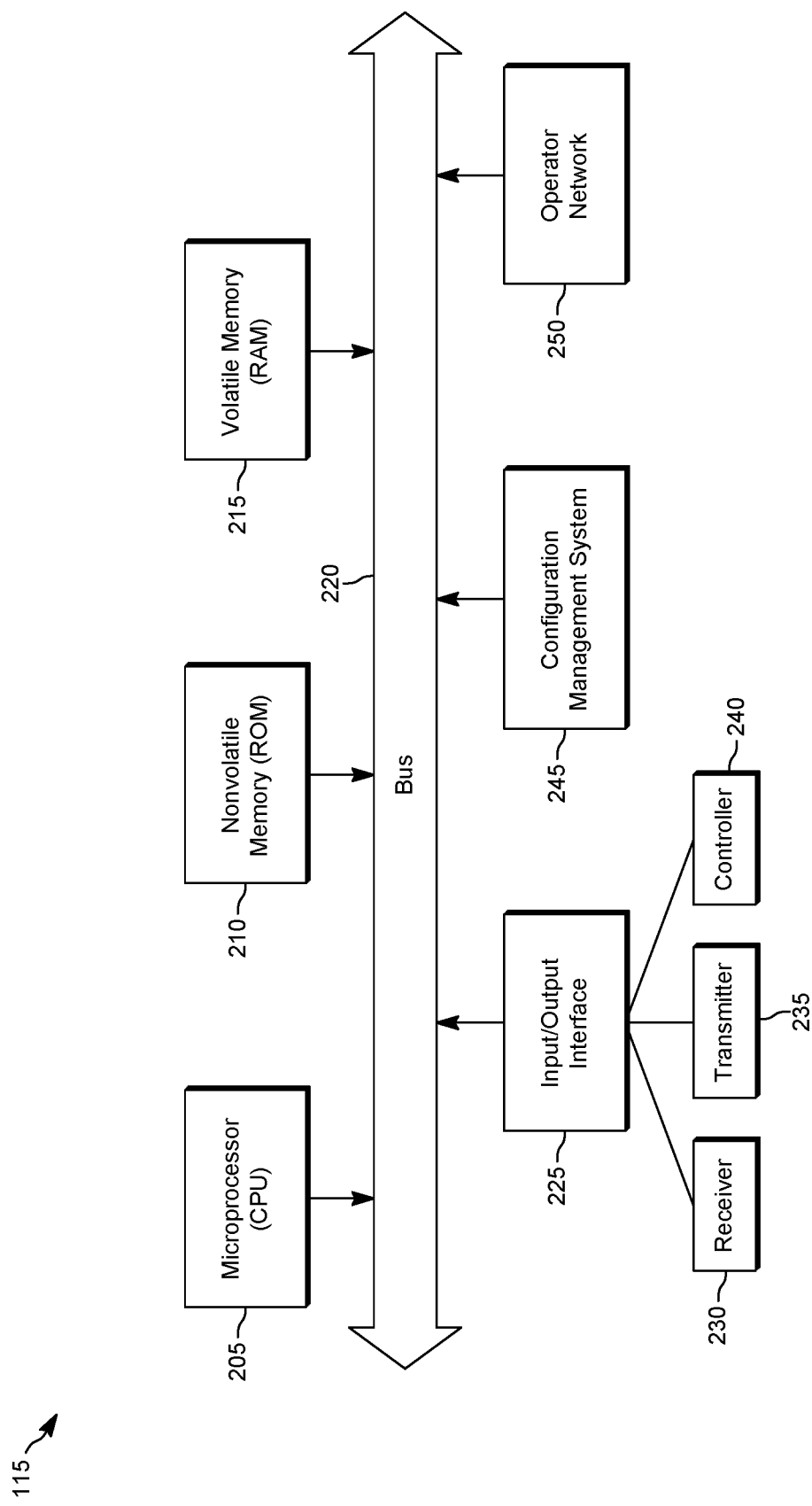
FIG. 2 is a component diagram of the electronic controller in FIG. 1, according to some embodiments.

Referring to FIG. 2, a component diagram of the electronic controller 115 is shown according to one embodiment. In the example illustrated, the electronic controller 115 includes a microprocessor (CPU) 205, a nonvolatile memory (ROM) 210, and a volatile memory (RAM) 215. The CPU 205 controls operations of the electronic controller 115. The ROM 210, or read-only memory, permanently stores data and information of the electronic controller 115. The RAM 215 (random access memory) temporarily stores currently used data and information of the electronic controller 115. The CPU 205, ROM 210, and RAM 215 are electrically coupled to a bus 220 that allows communication between various components of the electronic controller 115. The electronic controller 115 further includes an input/output (I/O) interface 225 containing a receiver 230, a transmitter 235, and a controller 240. The receiver 230 is configured to receive information, such as the transmit frequency 110, the receive frequency 125, and the location information 130, from outside sources, including the terrestrial transmitter 105 and the airborne receiver detection system 120. The transmitter 235 is configured to transmit the modified transmit frequency 150 from the electronic controller 115 to the terrestrial transmitter 105. The controller 240 controls the receiver 230 and transmitter 235 to receive and transmit the respective signals.

In some embodiments, the electronic controller 115 may further include a configuration management system 245 and an operator network 250. The configuration management system 245 is configured to receive a spectrum adjustment request from the CPU 205 and, in response to receiving the request, to generate a spectrum signature configuration that modifies the transmit frequency 110 based on a modification method described in further detail below. The operator network 250 is configured to receive a cylinder event from the CPU 205 and, in response to receiving the event, generate an alarm that an airborne receiver 135 is within a proximate distance of the terrestrial transmitter 105.

Figure 3:
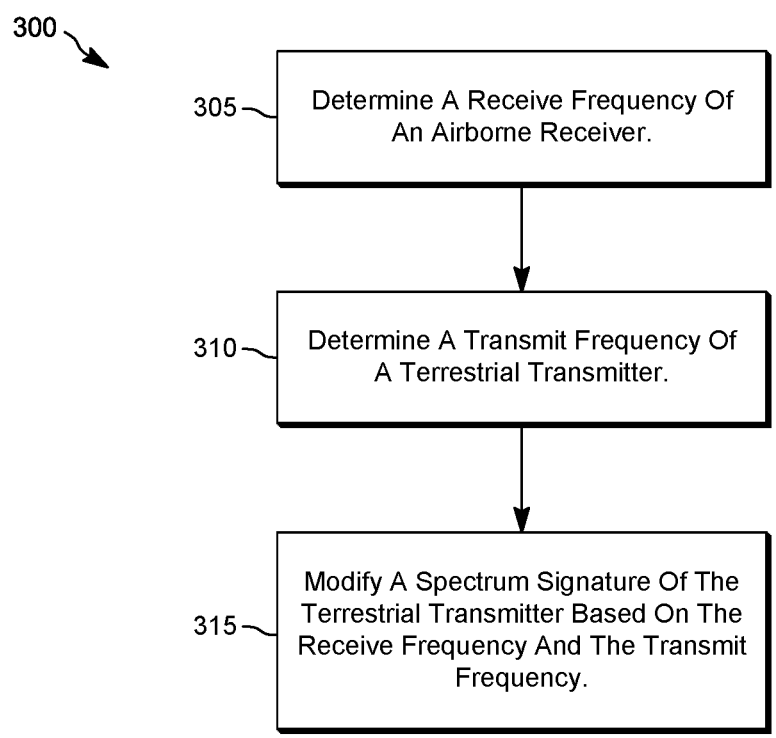
FIG. 3 is a flowchart illustrating a method of operating the terrestrial communication system, according to some embodiments.

FIG. 3 is a flowchart illustrating a method 300 of operating the terrestrial communication system 100 according to one embodiment. At block 305, the electronic controller 115 first determines the receive frequency 125 of the nearby airborne receiver 135 via the airborne receiver detection system 120. At block 310, the electronic controller 115 determines the transmit frequency 110 of the terrestrial transmitter 105 that is communicatively coupled to the electronic controller 115. After obtaining the transmit frequency 110 and the receive frequency 125, the electronic controller 115 selectively determines to modify the transmit frequency 110 based on a modification method, at block 315. This modification method 500 is described below in detail with respect to FIG. 5.

Figure 4:
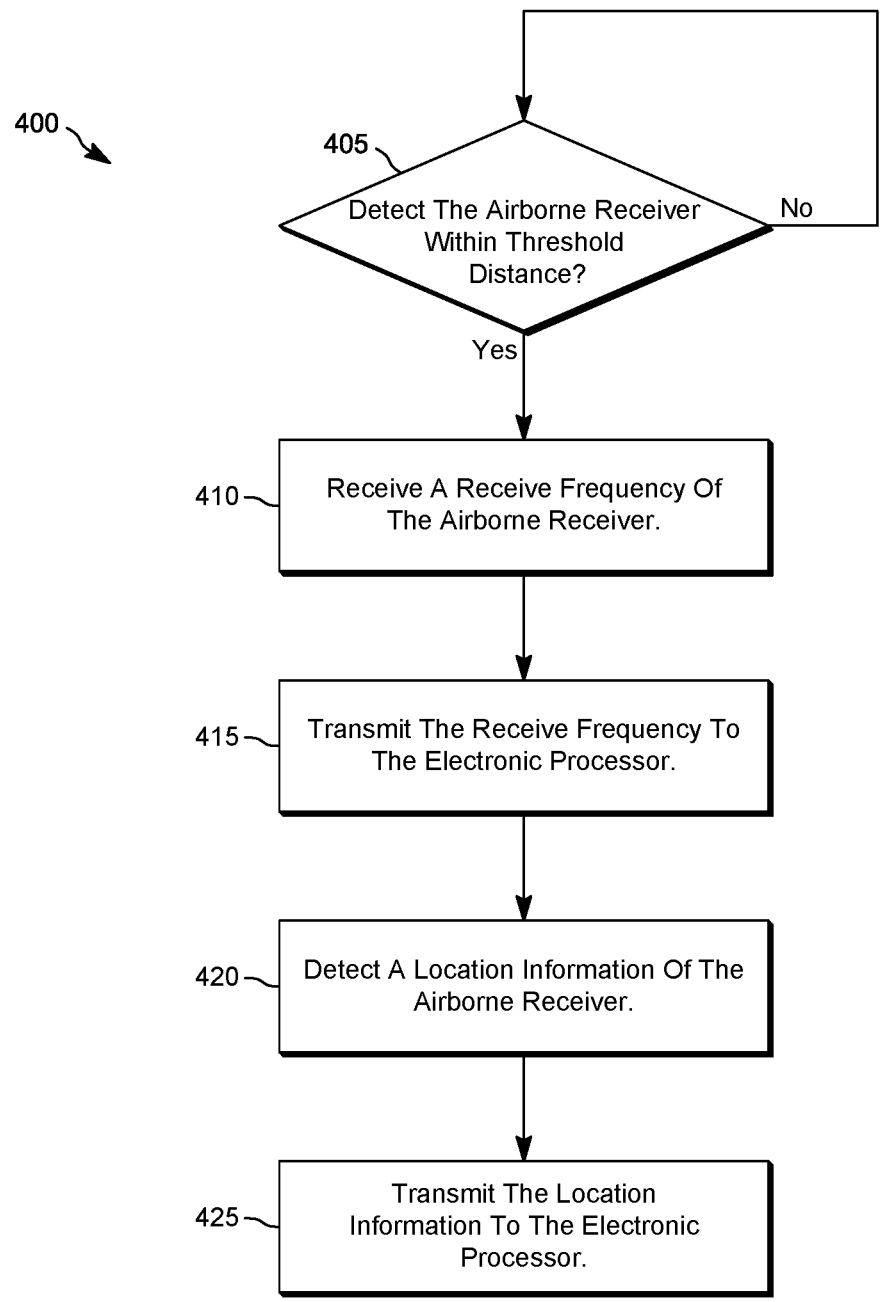
FIG. 4 is a flowchart illustrating a method of determining a receive frequency of an airborne receiver, according to some embodiments.

FIG. 4 is a flowchart illustrating a method 400 for determining the receive frequency 125 of the airborne receiver 135 according to one embodiment. To determine the receive frequency 125 of the airborne receiver 135, the airborne receiver detection system 120 detects the airborne receiver 135 within a threshold distance of the terrestrial transmitter 105, at block 405. When a nearby airborne receiver 135 is not detected, the airborne receiver detection system 120 continues at block 405 until a nearby airborne receiver 135 is detected. When a nearby airborne receiver 135 is detected, the airborne receiver detection system 120 detects the receive frequency 125 of the nearby airborne receiver 135 (at block 410) and transmits the receive frequency 125 to the receiver 230 of the electronic controller 115 (at block 415).

At block 420, the airborne receiver detection system 120 detects the location information 130 of the nearby airborne receiver 135. At block 425, the airborne receiver detection system 120 transmits the location information 130 to the receiver 230 of the electronic controller 115. In some embodiments, the location information 130 is not transmitted separately from the receive frequency 125. Rather, the receive frequency 125 includes the location information 130, which specifies the location and direction of travel for the approaching airborne receiver 135. From the included location information 130, the electronic controller 115 may calculate a distance between the terrestrial transmitter 105 and the approaching airborne receiver 135. In other embodiments, the location information 130 is not transmitted separately nor included in the receive frequency 125. In this case, the electronic controller 115 may derive the location information 130 directly from the receive frequency 125 using radiolocation technology.

Returning to FIG. 3, after successfully determining the receive frequency 125 (at blocks 410-415), the location information 130 (at blocks 420-425), and the transmit frequency 110 (at block 310), the electronic controller 115 proceeds to selectively execute a modification method (at block 315) to modify a spectrum signature of the terrestrial transmitter 105 based on the transmit frequency 110, the receive frequency 125, and the location information 130.

Figure 5:
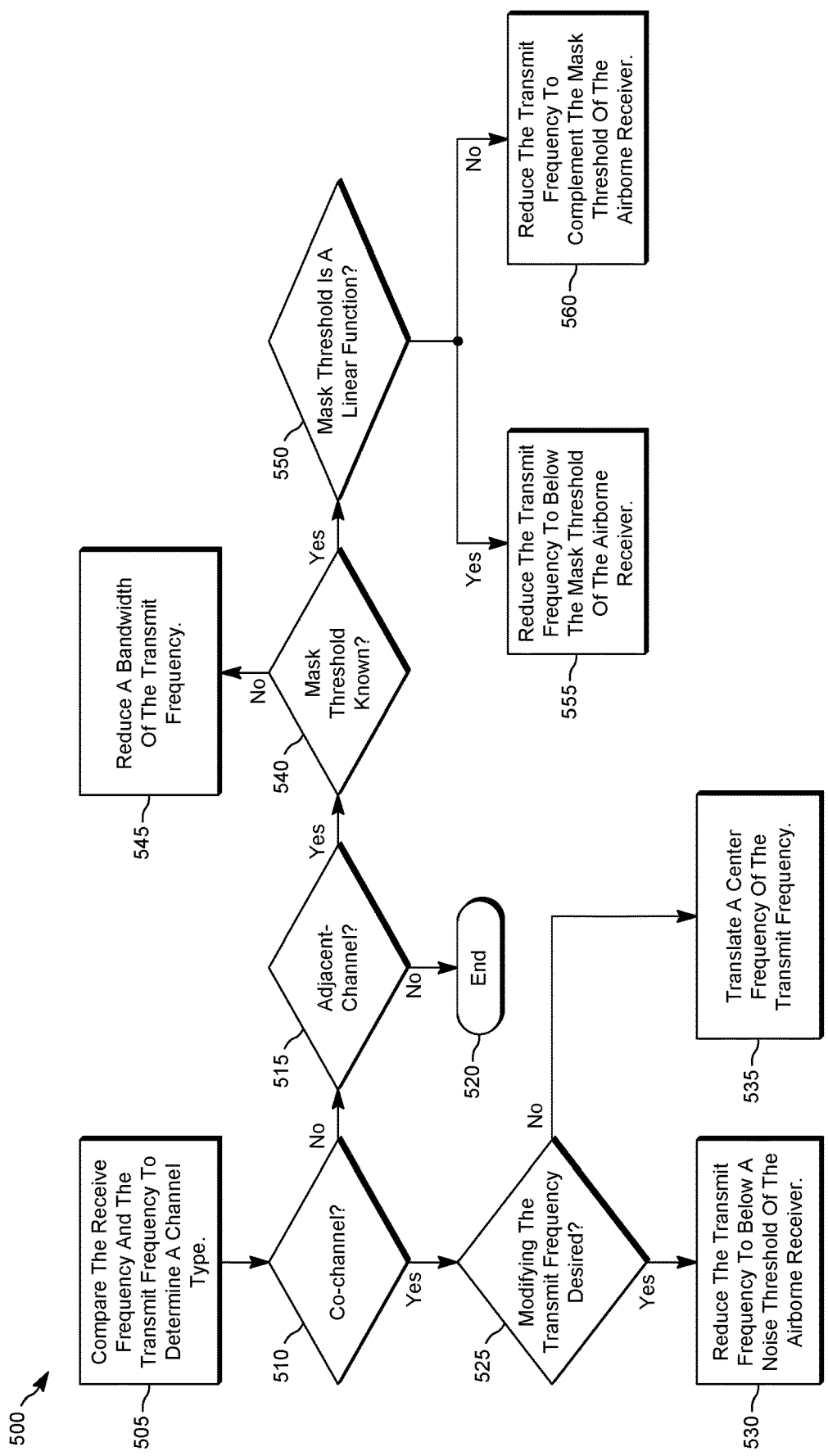
FIG. 5 is a flowchart illustrating a method of modifying a transmit frequency of a terrestrial transmitter, according to some embodiments.

FIG. 5 is a flowchart illustrating an example method 500 for modifying a spectrum signature of the terrestrial transmitter 105 according. At block 505, the electronic controller 115 compares the receive frequency 125 and the transmit frequency 110 to determine a channel type.

At block 510, when the transmit frequency 110 and the receive frequency 125 are transmitted within a same channel, the channel type is co-channel. This co-channel channel type is shown in graph 600A in FIG. 6A.

At block 515, when the transmit frequency 110 and the receive frequency 125 are not transmitted within the same channel but are transmitted via adjacent channels, the channel type is adjacent-channel. This adjacent-channel channel type is shown as graph 600B in FIG. 6B.

When the channel type is neither co-channel nor adjacent-channel, the transmit frequency 110 of the terrestrial transmitter 105 does not operate close enough in transmission bandwidth to interfere with the receive frequency 125 of the airborne receiver 135. Graph 600C in FIG. 6C shows when the receive frequency 125 is not corrupted by the transmit frequency 110. In the case where the channel type is neither co-channel nor adjacent-channel, the method 500 terminates, at block 520, until a new transmit frequency 110 and receive frequency 125 are received by the airborne receiver detection system 120.

Figure 6A:
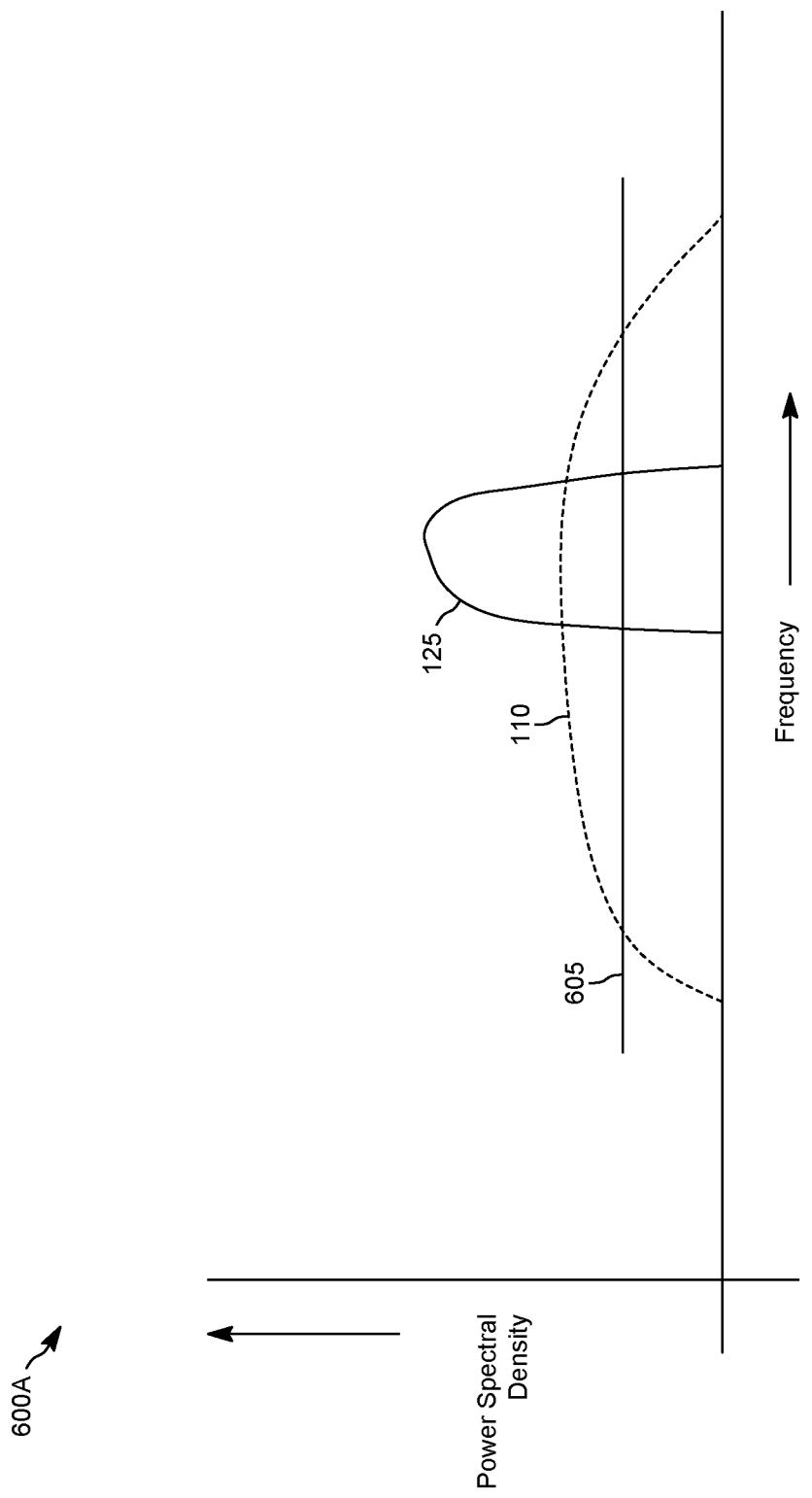
FIG. 6A is a graph illustrating the transmit frequency and the receive frequency in a co-channel channel type, according to some embodiments.
Figure 6B:
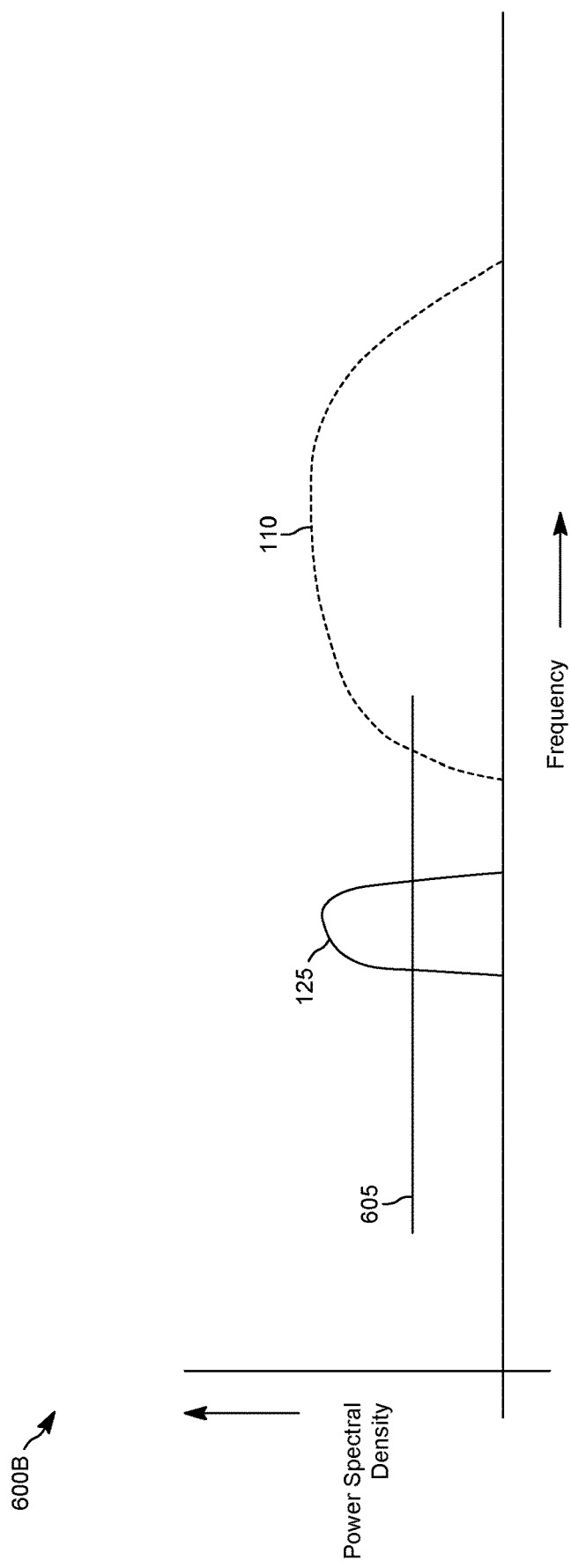
FIG. 6B is a graph illustrating the transmit frequency and the receive frequency in an adjacent-channel channel type, according to some embodiments.
Figure 6C:
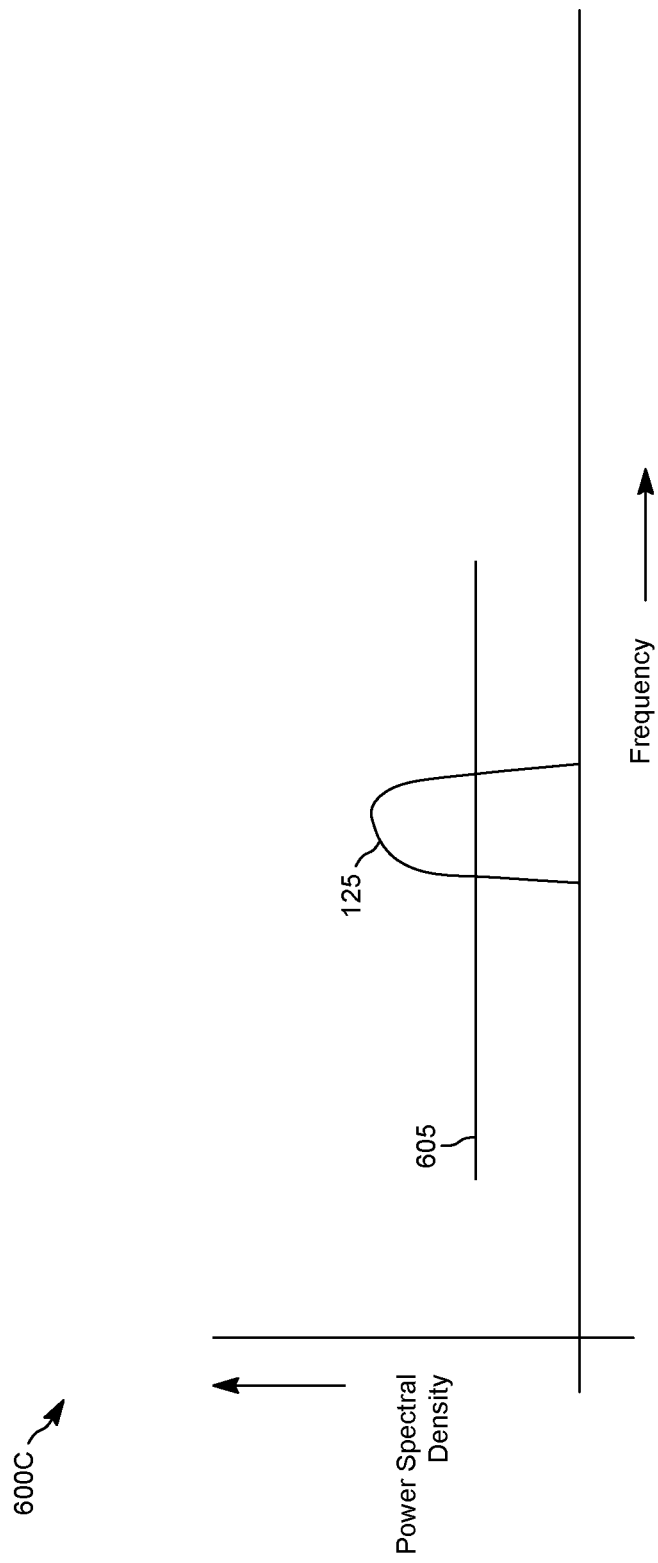
FIG. 6C is a graph illustrating the transmit frequency and the receive frequency in neither the co-channel nor the adjacent-channel channel type, according to some embodiments.

Referring to FIGS. 6A and 6B, the transmit frequency 110 will interfere with the receive frequency 125 in both the co-channel type illustrated in chart 600A and adjacent-channel type illustrated in chart 600B. Therefore, the terrestrial communication system 100 is needed to modify the transmit frequency 110 to not interfere with the receive frequency 125, as described in further detail below.

Returning to FIG. 5, when the channel type is co-channel (at block 510), the electronic controller 115 determines whether modifying the transmit frequency 110 is desired, at block 525. In some embodiments, the decision to modify the transmit frequency 110 may be determined by considerations including the difficulty in reducing the transmit frequency 110 or whether modifying the transmit frequency 110 would result in interference with other airborne receivers 135 also within a proximate distance of the terrestrial transmitter 105. If it is determined that modifying the transmit frequency 110 is desirable, then the electronic controller 115 reduces the transmit frequency 110 to below a noise threshold 605 of the airborne receiver 135, at block 530. Graph 600A in FIG. 7 illustrates the co-channeling transmit frequency 110 and the receive frequency 125 before modification. Graph 530G in FIG. 7 illustrates the transmit frequency 110 reduced to below the noise threshold 605 of the airborne receiver 135 so that the transmit frequency 110 does not interfere with the receive frequency 125.

When it is determined, at block 525, that modifying the transmit frequency 110 is not desirable, the electronic controller 115 translates a center frequency 615 of the transmit frequency 110, at block 535. Graph 600A in FIG. 8 illustrates the co-channeling transmit frequency 110 and the receive frequency 125 before modification. Graph 535G of FIG. 8 illustrates the center frequency 615 of the transmit frequency 110 translated to the right of the receive frequency 125, thereby increasing the frequency of the transmit frequency 110 so that the transmit frequency 110 and the receive frequency 125 avoid co-channeling. It should be understood by those skilled in the art that although FIG. 8 shows the center frequency 615 of the transmit frequency 110 translated to the right to increase frequency, the center frequency 615 of the transmit frequency 110 may be translated to the left to decrease frequency in other embodiments to achieve a similar effect.

Returning to FIG. 5, when the channel type is not co-channel, then the electronic controller 115 determines whether the channel type is adjacent-channel, block 515. When the channel type is adjacent-channel, the electronic controller 115 determines whether a mask threshold 610 of the airborne receiver 135 is known, at block 540. The mask threshold 610, which determines the maximum tolerable interference of the airborne receiver 135 (e.g., the maximum tolerance of the airborne receiver 135 to adjacent-channel interference), must be provided by the airborne receiver 135 either as a specification of the aircraft class or as a standard in the minimum operational standard guidelines. When the mask threshold 610 of the airborne receiver 135 is unknown, the electronic controller 115 reduces a frequency bandwidth 620 of the transmit frequency 110, at block 545. Graph 600B in FIG. 9 illustrates the adjacent-channeling transmit frequency 110 and the receive frequency 125 before modification. Graph 545G in FIG. 9 shows the transmit frequency 110 reduced in frequency bandwidth 620, thereby decreasing the frequency bandwidth range of the transmit frequency 110 so that the transmit frequency 110 and the receive frequency 125 avoid adjacent-channeling.

At block 540, when the electronic controller 115 determines that the mask threshold function 610 of the airborne receiver 135 is known, it proceeds to determine whether the mask threshold function 610 is a linear function, at block 550. Whether the mask threshold function 610 is a linear function is determined by the frequency selectivity and linearity of the airborne receiver 135. When the electronic controller 115 determines that the mask threshold function 610 is a linear function, it reduces the transmit frequency 110 to below the linear mask threshold function 610 of the airborne receiver 135, at block 555. Graph 600B in FIG. 10 illustrates the adjacent-channeling transmit frequency 110 and the receive frequency 125 before modification. Graph 555G in FIG. 10 shows the transmit frequency 110 reduced to below the linear mask threshold 610 (See FIG. 11) of the airborne receiver 135 so that the transmit frequency 10 does not rise above the maximum adjacent-channel interference tolerable by the airborne receiver 135.

Figure 11:
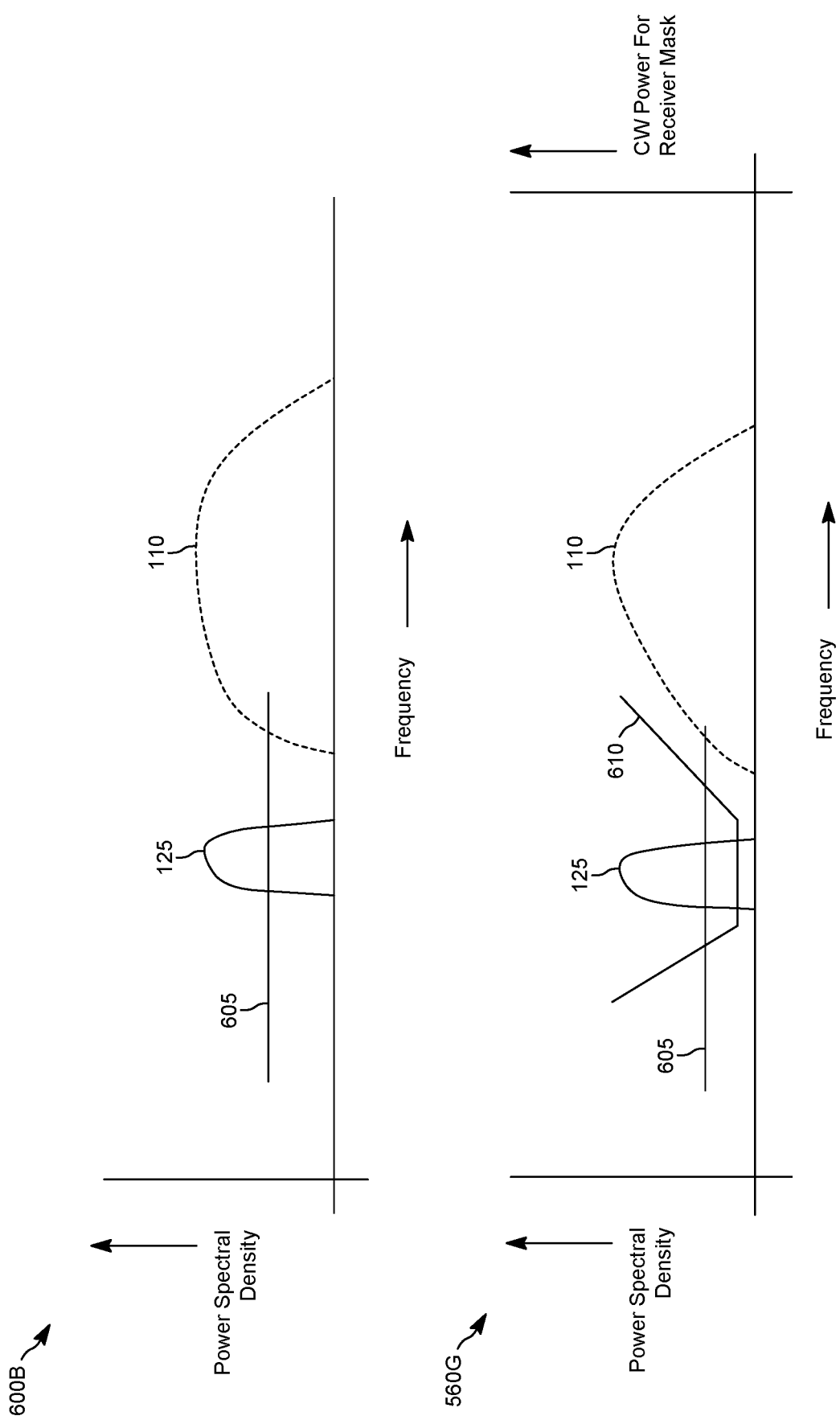
FIG. 11 is a graph illustrating reducing the transmit frequency to complement the mask threshold function of the airborne receiver in the adjacent-channel channel type, according to some embodiments.

Additionally, when the electronic controller 115 determines that the mask threshold function 610 is not a linear function, it reduces the transmit frequency 110 to complement a power spectral density profile of the mask threshold function 610, at block 560. In the embodiment illustrated in FIG. 11, the power spectral density profile of the mask threshold function 610 is a function of the varying power density tolerable by the airborne receiver 135 with respect to frequency. Graph 600B in FIG. 11 illustrates the adjacent-channeling transmit frequency 110 and the receive frequency 125 before modification (performed at block 560). Graph 560G in FIG. 11 illustrates the transmit frequency 110 reduced to complement the mask threshold function 610 as a function of power density to frequency. In this embodiment, the transmit frequency 110 does not need to be entirely reduced to below a linear mask threshold function 610. Rather certain portions of the transmit frequency 110 may remain unchanged as long as the power density of the transmit frequency 110 is below the maximum tolerable power density of the airborne receiver 135 at all points in frequency. This modification allows the transmit frequency 110 to remain as unaffected as possible while still ensuring that the airborne receiver 135 receives continuous aviation communication without noise or noticeable interference.

All combinations of embodiments and variations of design are not exhaustively described in detail herein. Said combinations and variations are understood by those skilled in the art as not deviating from the teachings of the present application.

What is claimed is:

1. A terrestrial communication system comprising:
    a terrestrial transmitter configured to transmit signals to terrestrial receivers; and
    an electronic processor communicatively coupled to the terrestrial transmitter, and configured to
        determine a receive frequency of an airborne receiver;
        determine a transmit frequency of the terrestrial transmitter; and
        modify a spectrum signature of the terrestrial transmitter based on the receive frequency and the transmit frequency to prevent the transmit frequency of the terrestrial transmitter from interfering with the receive frequency of the airborne receiver.

2. The terrestrial communication system of claim 1, further comprising:
    a collision avoidance system configured to
        detect the airborne receiver; and
        in response to detecting the airborne receiver, transmit a location of the airborne receiver and the receive frequency to the electronic processor.

3. The terrestrial communication system of claim 2, wherein the collision avoidance system is configured to detect the airborne receiver using acoustics-based aircraft detection.

4. The terrestrial communication system of claim 1, further comprising:
    an automatic dependent surveillance broadcast (ADSB) system configured to
        detect the airborne receiver; and
        in response to detecting the airborne receiver, transmit a location of the airborne receiver and the receive frequency to the electronic processor.

5. The terrestrial communication system of claim 1, wherein the electronic processor is further configured to
    compare the receive frequency and the transmit frequency to determine a channel type; and
    modify the spectrum signature based on the channel type;
    wherein the channel type is one selected from a group consisting of co-channel and adjacent-channel.

6. The terrestrial communication system of claim 5, wherein the electronic processor is further configured to modify the spectrum signature by reducing the transmit frequency below a noise threshold of the airborne receiver when the channel type is co-channel.

7. The terrestrial communication system of claim 5, wherein the electronic processor is further configured to modify the spectrum signature by reducing the transmit frequency below a mask threshold of the airborne receiver when the channel type is adjacent-channel.

8. The terrestrial communication system of claim 7, wherein the mask threshold is less restrictive than a noise threshold of the airborne receiver.

9. The terrestrial communication system of claim 7, wherein the mask threshold is based on a frequency selectivity and a linearity of the airborne receiver.

10. The terrestrial communication system of claim 7, wherein the mask threshold is a function of a maximum tolerable interference with respect to a transmit frequency for the airborne receiver.

11. The terrestrial communication system of claim 10, wherein the electronic processor is further configured to modify the spectrum signature by reducing the transmit frequency to complement the mask threshold.

12. The terrestrial communication system of claim 5, wherein the electronic processor is further configured to modify the spectrum signature by translating a center frequency of the transmit frequency when the channel type is co-channel.

13. The terrestrial communication system of claim 5, wherein the electronic processor is further configured to modify the spectrum signature by reducing a bandwidth of the transmit frequency when the channel type is adjacent-channel.

14. A method of operating a terrestrial communication system comprising:
    determining a receive frequency of an airborne receiver;
    determining a transmit frequency of a terrestrial transmitter configured to transmit signals to terrestrial receivers; and
    modifying a spectrum signature of the terrestrial transmitter based on the receive frequency and the transmit frequency to prevent the transmit frequency of the terrestrial transmitter from interfering with the receive frequency of the airborne receiver.

15. The method according to claim 14, further comprising:
- detecting the airborne receiver; and
- in response to detecting the airborne receiver, transmitting a location of the airborne receiver and the receive frequency to an electronic processor.

16. The method according to claim 14, wherein modifying the spectrum signature of the terrestrial transmitter further comprises:
- comparing the receive frequency and the transmit frequency to determine a channel type; and
- modifying the spectrum signature based on the channel type,
- wherein the channel type is one selected from a group consisting of co-channel and adjacent-channel.

17. The method according to claim 16, wherein modifying the spectrum signature includes reducing the transmit frequency to below a noise threshold of the airborne receiver when the channel type is co-channel.

18. The method according to claim 16, wherein modifying the spectrum signature includes reducing the transmit frequency to below a mask threshold of the airborne receiver when the channel type is adjacent-channel.

19. The method according to claim 16, wherein modifying the spectrum signature includes translating a center frequency of the transmit frequency when the channel type is co-channel.

20. The method according to claim 16, wherein modifying the spectrum signature includes reducing a bandwidth of the transmit frequency when the channel type is adjacent-channel.

* * * * *